(No Model.)
W. S. STANDIFER.
INSTRUMENT FOR FARMERS' USE ON HILLY LAND.
No. 463,771. Patented Nov. 24, 1891.
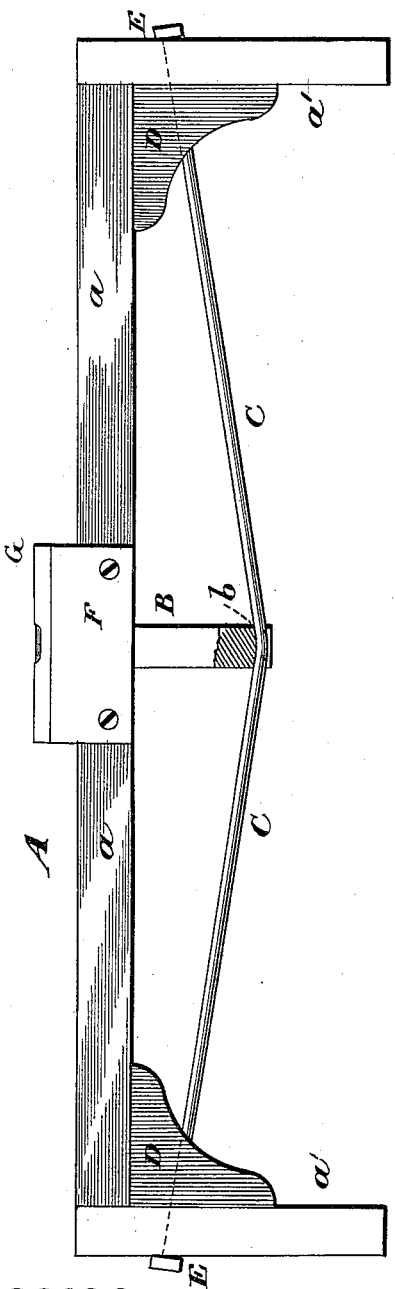
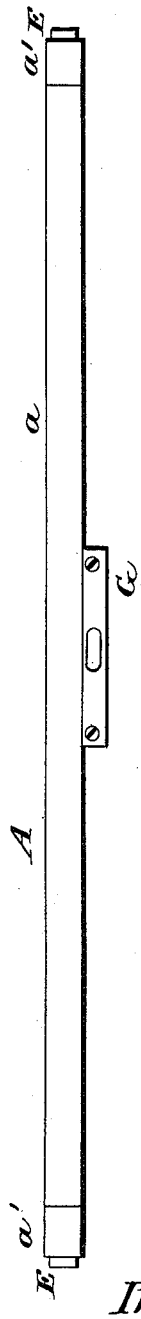
Witnesses.
H. Ruppert
H. A. Daniels
Inventor.
Wm. S. Standifer
Per
Thomas P. Simpson
Atty

UNITED STATES PATENT OFFICE.

WILLIAM SYLVESTER STANDIFER, OF CARY, MISSISSIPPI.

INSTRUMENT FOR FARMERS' USE ON HILLY LAND.

SPECIFICATION forming part of Letters Patent No. 463,771, dated November 24, 1891.

Application filed April 1, 1891. Serial No. 387,271. (No model.)

*To all whom it may concern:*

Be it known that I, WILLIAM SYLVESTER STANDIFER, a citizen of the United States, residing at Cary, in the county of Sharkey and State of Mississippi, have invented a certain new and useful Instrument for Farmers' Use on Hilly Land; and I do hereby declare the following to be a full, clear, and exact description of the invention, such as will enable others skilled in the art to which it appertains to make and use the same.

The special object of the invention is to make an instrument by which may be laid off on hilly lands proper base-lines, from which the ground may be furrowed or plowed and cultivated, so as to allow an escape for surplus surface-water without washing off the soil or making gullies.

Figure 1 of the drawings is a side elevation of my instrument, and Fig. 2 a plan view, showing a level.

In the drawings, A represents my base-line instrument, consisting of the horizontal bar $a$, preferably from twenty to twenty-five feet long and provided at the ends with the parallel legs $a'$ $a'$, about three feet long. From the middle of the bar A and from its under side is suspended the pendant B, having an end groove $b$, in which fits a metallic rod C, threaded at each end. These ends pass through the right-angled corner spaces D D, and also through the legs $a'$ $a'$, receiving the nuts E E on the outside of said legs. In this way all the parts of the instrument are secured rigidly and durably together.

On top of the bar A and to the side of a plate F, which is screwed or otherwise fastened to the side of said bar, I make fast the level G.

The operator carries the instrument in his hands and starts where the rows of plants will terminate and where it is wished to discharge the surplus surface-water. From this point he runs a base-line around the hill on a gradual rise of two or three inches in every twenty or thirty feet until he gets half-way around the hill or to the middle of the intended base-line, when he descends with the same pitch or decline to the other end of intended rows or base-line. On this line the legs are made to rest on the ground at short intervals, and at these points a stake is lightly driven or a spadeful of earth thrown to clearly designate the desired line of demarkation. The plow then runs a furrow on this line and subsequent furrows parallel thereto. I preferably make these base-lines from thirty to fifty feet apart; but they may be more or less.

Thousands of acres of land are being ruined every year from working across hills with furrows at the wrong pitch to carry off the surplus water harmlessly. By running the furrows haphazard about the hills the water is not divided and equalized on its lines of travel, but takes its natural course, an aggregate being collected at some points sufficient to run across the furrows and take off the soil or else running between the rows of plants and forming gullies.

My instrument may be also used with great advantage in ditching, so as to lay off with great exactitude the lines between which the ditch is to be dug.

I am aware that it is old to make a railroad-gage with a spirit-level so as to set outer rail of a track higher than the other on a curve; but an essential element in this is a scale-rod working through a hole in one end of the gage.

What I claim as new and of my invention is—

A new article of manufacture consisting of the frame $a'$ $a'$, carrying a spirit-level, the pendant B, having groove $b$, the corner spacers D, and the end-threaded rod C, having nuts E, all combined to form a furrow-guide for farmers in plowing hillsides, as and for the purpose specified.

In testimony whereof I affix my signature in presence of two witnesses.

WILLIAM SYLVESTER STANDIFER.

Witnesses:
ALBERT SIMON,
MAX FEIBELMAN.